(12) United States Patent
Kennedy

(10) Patent No.: US 6,188,989 B1
(45) Date of Patent: *Feb. 13, 2001

(54) SYSTEM AND METHOD FOR MANAGING AVAILABLE TO PROMISED PRODUCT (ATP)

(75) Inventor: Brian M. Kennedy, Coppell, TX (US)

(73) Assignee: i2 Technologies, Inc., Dallas, TX (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/491,167

(22) Filed: Jun. 16, 1995

(51) Int. Cl.⁷ .................................................. G06F 17/60

(52) U.S. Cl. ................................................ 705/8; 705/10

(58) Field of Search ................................. 395/208, 210; 705/8, 10; 709/103, 104; 700/99, 100, 101, 106

(56) References Cited

U.S. PATENT DOCUMENTS

| | | | |
|---|---|---|---|
| 4,209,845 | 6/1980 | Berger et al. | 364/900 |
| 4,611,280 | 9/1986 | Linderman | 364/300 |

(List continued on next page.)

FOREIGN PATENT DOCUMENTS

| | | | |
|---|---|---|---|
| 0231552 | 8/1987 | (EP) . | |
| 025405 | 8/1990 | (EP) . | |
| 0 425 405 A2 | * 8/1990 | (EP) | G06F/15/24 |
| 0 463 616 A2 | 1/1992 | (EP) | G06F/15/21 |
| 0 615 198 A1 | * 3/1993 | (EP) | G06F/15/21 |
| 0615198 | 9/1994 | (EP) | G06F/15/21 |
| 2293902 | 4/1996 | (GB) | G05B/19/418 |

OTHER PUBLICATIONS

David M. McClutcheon et al., "The Customization–Responsiveness Squeeze", Sloan Management Review, v 35 n 2, pp. 89–99, Wint, 1994.*

Dusty Rhodes, "The Keys to the Enterprise: Integrated Applications Drive Information Systems to New Horizons", HP Professional, v 5, n 11, pp. 44–46, Nov. 1991.*

Frank O. Smith, "Dun & Bradstreet Software Delivers Sales and Promotion System Manufacturers", Business Wire, s 1, p. 1, Jun. 11, 1990.*

(List continued on next page.)

Primary Examiner—Emanuel Todd Voeltz
Assistant Examiner—Alexander Kalinowski
(74) Attorney, Agent, or Firm—Baker Botts L.L.P.

(57) ABSTRACT

A system and method are disclosed for automatically managing available to promise product and making of promises to fulfill customer requests from the available to promise product. The system includes a data storage device that stores at least one seller model which represents a seller entity that is selling at least one product. The system also includes an execution memory operable to hold a software system, and a processor operable to execute the software system. When executed, the software system operates to use the at least one seller model to represent a forecast for the number of the at least one product that is expected to be sold by the seller and to define commitment levels with respect to the forecast in order to create forecast requests for the at least one product. The software system then provides the forecast requests to supplier sites and receives responsive promises made by the supplier sites to fill the forecast requests. The software system represents the promises made by the supplier sites to the seller entity as available to promise product to be used for promising to fill actual customer requests, and adjusts the available to promise product responsive to any promises made to fill actual customer requests. The available to promise product thereby automatically reflects product that has been promised by a supplier site but not promised to a customer.

82 Claims, 2 Drawing Sheets

U.S. PATENT DOCUMENTS

| | | | |
|---|---|---|---|
| 4,611,310 | 9/1986 | Durbin | 365/230 |
| 4,827,423 | 5/1989 | Beasley et al. | 364/468 |
| 5,089,970 | 2/1992 | Lee et al. | 364/468 |
| 5,101,352 * | 3/1992 | Rembert | 364/401 |
| 5,128,861 | 7/1992 | Kagami et al. | 705/10 |
| 5,148,370 | 9/1992 | Litt et al. | 364/468 |
| 5,175,857 | 12/1992 | Inoue | 395/800 |
| 5,216,612 | 6/1993 | Cornett et al. | 364/468 |
| 5,218,700 | 6/1993 | Beechick | 395/700 |
| 5,233,533 | 8/1993 | Edstrom et al. | 364/468 |
| 5,280,425 | 1/1994 | Hogge | 364/402 |
| 5,303,144 | 4/1994 | Kawashima et al. | 364/401 |
| 5,369,570 | 11/1994 | Parad | 364/401 |

OTHER PUBLICATIONS

Marilyn K. McClelland, "Using Simulation to Faciltiate Ananlysis of Manufacturing Strategy", Journal of Business Logistics, vol. 13, No. 1, pp. 215–237, 1992.*

* cited by examiner

US 6,188,989 B1

SYSTEM AND METHOD FOR MANAGING AVAILABLE TO PROMISED PRODUCT (ATP)

CROSS REFERENCE TO RELATED APPLICATIONS

This application is related to the following applications which are incorporated by reference herein:

U.S. application Ser. No. 08/491,153, and entitled EXTENSIBLE MODEL NETWORK REPRESENTATION SYSTEM FOR PROCESS PLANNING (Attorney Docket No. 020431.0136);

U.S. application Ser. No. 08/491,121, and entitled INTERACTIVE REPORT GENERATION SYSTEM AND METHOD OF OPERATION (Attorney Docket No. 020431.0137);

U.S. application Ser. No. 08/491,168, and entitled STRATEGY DRIVEN PLANNING SYSTEM AND METHOD OF OPERATION (Attorney Docket No. 020431.0138).

TECHNICAL FIELD OF THE INVENTION

This invention relates in general to the fields of demand management, supply chain management, and capacity management. More particularly, the present invention relates to a system and method for managing available-to-promise product (ATP) and making promises to fulfill customer requests.

BACKGROUND OF THE INVENTION

Manufacturers produce products for sale to customers. In the sales process, customers place demands on manufacturers. A customer demand may consist of a request for a particular quantity of a product by a specific date. This date and quantity information may be collectively referred to as the "customer request" or "request information".

Manufacturing and distribution facilities have limited resources (capacity) and limited inventories (materials). Therefore, every customer request may not be satisfiable in that some may receive no promise, others may receive an inadequate one. Planning and managing which customer requests to promise and fulfill, termed "demand management", is a fundamental and critical activity of most manufacturing and distribution organizations.

Due to material, capacity and other limitations, a manufacturer may not be able to meet a particular customer request. In this situation, the manufacturer typically negotiates with the customer to deliver a quantity of product by one or more dates agreeable to the customer. This date and quantity information may be referred to as the "manufacturer promise" or "promise information". Based on the manufacturer promise, the manufacturer creates operational plans to implement the promise information. Manufacturers may use a combination of diverse software tools in the negotiating and planning processes.

Traditional methods for demand management have several problems. First, such methods and systems are not integrated. Several different tools may be required to implement the entire demand management strategy. Second, such traditional systems and methods are not dynamic. Once a plan is in place, it is difficult for the manufacturer to react to changing circumstances and update the plan. Third, order promising to customers is often done based upon an infeasible plan. Later attempts to find a feasible plan that will satisfy the promises are often futile.

The environment today requires more and more responsiveness. Customers require significant product diversity and want promises to be made to their requests immediately, while on the phone. The traditional way of promising in configure-to-order or make-to-order environments involves submitting the request to the planners and then, a few days or weeks later, after the planners have gone through a planning cycle, receiving a promise or rejection.

Many manufacturing and distribution organizations have several sales offices associated with each manufacturing factory. Each sales office independently promises to supply products from the factory to customers. This is referred to as a "distributed organization". Each sales person in each of the sales organizations needs to be able to make instantaneous promises, simultaneously with other sales people doing the same. In addition, each of those promises need to be fulfillable by a feasible plan.

To better meet customer demand, the manufacturer must build product and/or intermediate items before receiving customer orders. This production is based on projections called "forecast orders". A product produced based on these forecast orders is referred to as "available to promise" or "ATP". ATP consists of quantities of products with associated dates that the products are scheduled to be available for delivery to the customer.

In distributed organizations a sales office may need approval from the factory before ATP may be promised to meet a customer request. This approval process may take up to a week under current practices. This delay is unacceptable in today's business environment.

SUMMARY OF THE INVENTION

In accordance with the present invention, a system and method for managing available to promise product (ATP) is provided that substantially eliminate or reduce disadvantages and problems associated with previously developed systems and methods.

More particularly, one embodiment the present invention provides a method for managing ATP in a distributed organization. The distributed organization comprises at least one supplying facility such as a factory. Additionally, the distributed organization comprises a plurality of requesting facilities for each supplying facility. The requesting facilities may comprise, for example, sales offices. The requesting facilities and the supplying facilities may be coupled by a computer network.

In this embodiment, the requesting facilities each store forecast orders in a memory of a computer at the requesting facility. The forecast orders include request information. As defined previously, the request information includes the quantity (or range of quantities) of product requested from the supplying facility and the date (or range of dates) it is needed. A master scheduling software system may be used to selectively plan use of, for example, manufacturing capacity of the supplying facility to meet selected forecast orders based on predetermined criteria. If a feasible and desirable plan can be devised that satisfies the request, then the supplier may make a promise to the customer that the supplier will satisfy the request. The promises to meet the selected forecast orders may be transmitted directly to the customers over a computer network.

In environments where customers are not willing to wait for a plan to be developed to get a promise, the supplying facility must create promises in advance that are available for immediate transfer to a customer. In this embodiment, future requests can be forecasted and a plan can be made to satisfy and promise those forecast requests. When an actual customer request is received, one or more (or a portion of)

promises made to forecast requests may be instantly reassigned to the customer request.

A technical advantage of the present invention includes the ability in a distributed organization with distributed sales people to allocate some of the promises made to forecast requests to certain sales people, thereby preventing them from simultaneously using the same forecast promise as a promise to a customer, without requiring them to check with each other before making promises. In this embodiment, each sales organization or person can be modeled and each forecast request/promise can be allocated to one such sales entity.

Another technical advantage of the present invention is that the allocation of promises may also be done for business management reasons. For example, a sales organization may be allocated promises based upon how much they are willing to commit to selling. This embodiment allows each sales entity to create its own forecast of what it could sell and establish the level it is willing to commit to selling. Forecast requests are then generated from the committed levels. Promises made to those requests become allocated to that sales entity for it to use to form promises for customer requests.

A further technical advantage of the present invention is that it allows these sales entities to be organized into hierarchies (for example, sales person within sales office within marketing organization). Promises that are allocated to a sales organization can be used by the sales people within that organization. Coordination is required in such cases to ensure that two sales people do not consume the same promises. But where such coordination is feasible, it is typically desirable to have some allocations that are common among them.

Another technical advantage of the present invention is that customer requests that cannot currently be promised can be queued. As conditions change, the queued requests have the first opportunity to be promised. Without such a queuing mechanism, requests that cannot be promised are forgotten. When new capacity frees, the next customer that happens to make a request gets that newly freed capacity.

An additional technical advantage of the present invention is that an entire distributed organization of suppliers and customers can be modeled along with the requests and promises placed between them. In this way, planners can view, manage, and plan the activity of a whole network where the interfaces between elements must be formal (separate corporations).

Another technical advantage of the present invention is that each sales entity can define the "products" it sells, where a product is an item priced based on the item, the quantity, the order lead time (time from accepting the order to the requested due date), and the customer. For each such product, an independent forecast and commitment can be made, independent forecast requests can be issued, and independent promises can be received. In this way, promises can be allocated for requests with particular characteristics. For example, one product may sell an item for $5 if the order lead time is greater than 6 weeks. Another product may sell the same item for $10 but with as short as 1 week lead time. Thus, a customer request with 6 week order lead time may be received when all allocations for that product have been consumed. However, if all the allocations for the 1 week order lead time product have not been consumed, then the customer can be given an option: the next available promise for the 6 week order lead time product would be 2 weeks later than your due date, or alternatively you may choose to pay $10 for the 1 week order lead time product and to receive it on time. Such management of products can prevent higher future profits for being sold at lower profits because they are promised first-come-first-served.

A further technical advantage of the present invention is that the forecast requests can specify how they expire. Some may shift out in time if they are not consumed; others may expire and disappear if not consumed. Such auto-maintenance of forecast requests can be very valuable in maintaining accurate forecasts and allocations for hundreds or thousands of products.

BRIEF DESCRIPTION OF THE DRAWINGS

A more complete understanding of the present invention and the advantages thereof may be obtained by reference to the following description taken in conjunction with the accompanying drawings in which like reference numbers indicate like features, and wherein.

DETAILED DESCRIPTION OF THE INVENTION

The Supply Chain, Site, and Seller Models

Figure 1:
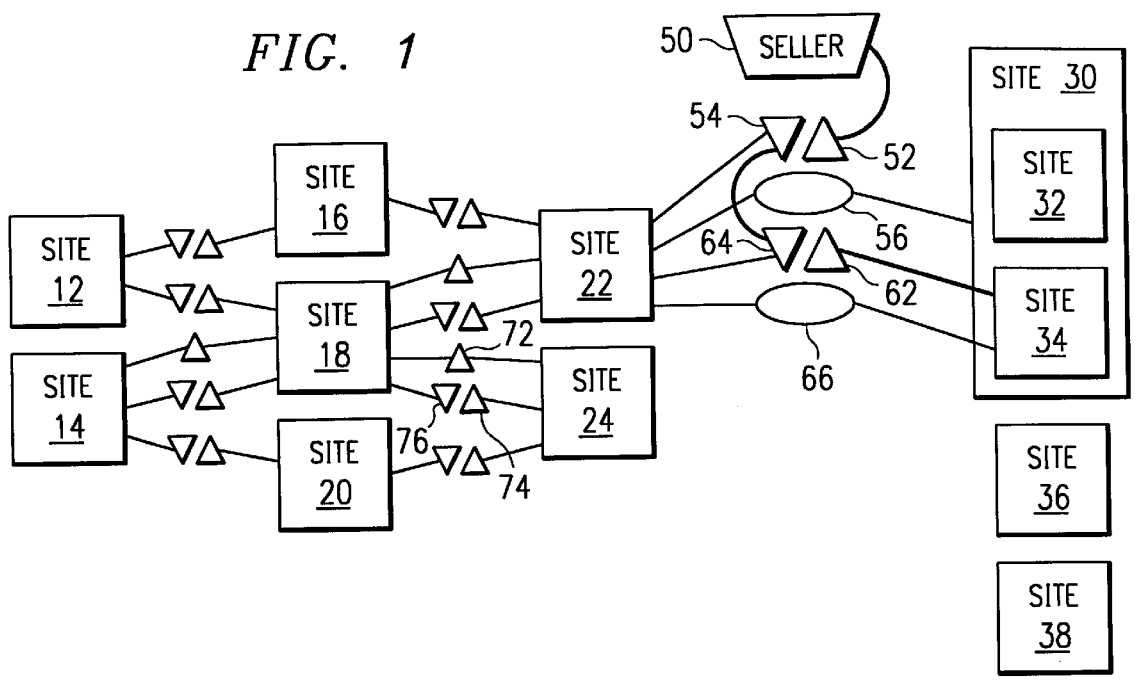
FIG. 1 is a block diagram of one embodiment of a supply chain model, including site models and seller models, and requests and promises between them.

FIG. 1 is a block diagram of one embodiment of a supply chain model, including site models and seller models, and requests and promises between them. FIG. 1 provides an example supply chain according to the teachings of the present invention. The supply chain model of FIG. 1 comprises twelve site models, 12, 14, 16, 18, 20, 22, 24, 30, 32, 34, 36, and 38. These site models represent organizational units that may have the capacity and materials to produce or consume items. Each site can place requests for items upon other sites. Requests are in general indicated in FIG. 1 by triangles 52, 62, 72, and 74. For each request 52, 62, 72, and 74, the site 12, 14, 16, 18, 20, 22, 24, 30, 32, 34, 36, or 38 being requested can make a promise to fulfill (wholly or partially) that request. Promises are in general indicated by inverted triangles 54, 64, and 76. Other primary members of a supply chain model are seller models. The embodiment of a supply chain of FIG. 1 consists of a single seller model 50. A seller model 100 is partially depicted in FIG. 2 and consists of a list of products 110 that seller 100 offers for sale. A product model 110 defines the supplier site, the item at that site, a minimum order lead time, a minimum quantity, and the allowed customer sites. If a customer request fits those criteria of a product, then that request is eligible to be filled by that product, at the pricing specified by that product.

Figure 2:
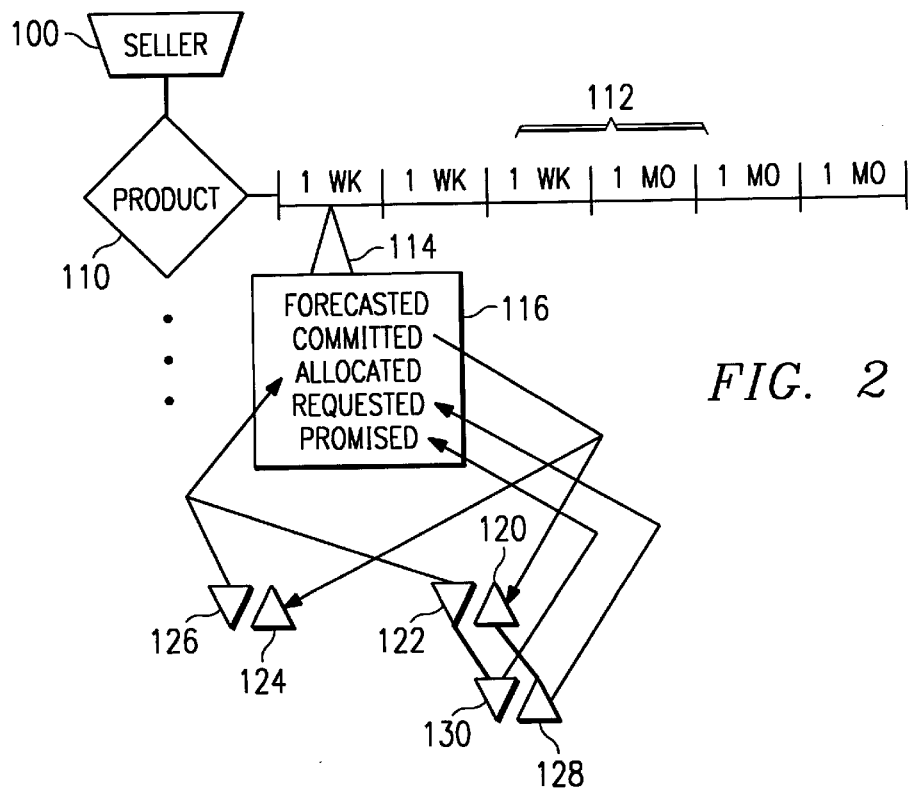
FIG. 2 illustrates one embodiment of a forecast entry for one of several forecast periods for one of several products within a seller.

FIG. 2 illustrates one embodiment of a forecast entry for one of several forecast periods for one of several products within a seller. For each product 110, a forecast horizon 112 is laid out. Forecast horizon 112 can be broken up arbitrarily. In this embodiment, three 1-week periods (the first being 114) are followed by three 1-month periods. For each forecast period for each product, a forecast-entry 116 is generated. The 'forecasted' and 'committed' values can be filled in. The value 'forecasted' is the seller's estimate for how much could be sold of that product 110 during that period. The value 'committed' is the quantity the seller is willing to commit to selling.

The committed quantity results in 'forecast' requests being generated in an amount equal to the committed quantity, spread out through the corresponding forecast period according to a forecast policy specified by the product 110. In the embodiment of FIG. 2, the committed amount results in generation of requests 120 and 124, spaced out in the period 114. The site on which the requests 120 and 124 were placed (specified by the product 110) can then issue promises. Assuming promises 122 and 126 are made for requests 120 and 124, respectively, the value of 'allocated' in the forecast entry 116 for period 114 will be the sum total of the promised quantities.

The allocated amount is the summary amount the seller has available to promise customer requests. When customer request 128 arrives to the seller for product 110 during period 114, the seller can take one or both (or part of one or both) promises that it has already received, break them up or combine them to form a promise for the customer request. The forecast requests are simultaneously adjusted down by the amount of the customer request. So, for example, if the committed value of forecast entry 116 was 500 units, the two forecast requests 120 and 124 were for 250 units each, the two promises 122 and 126 were received for 200 units, and the customer request 128 was for 300 units, then the two forecast requests 120 and 124 will be adjusted to a total of 200 (i.e., 200 and 0 or 100 and 100 or some other combination, dependent upon the product's forecast policy). The two promises 122 and 126 will be adjusted to a total of 100, and a new promise 130 will be created for 300 units to satisfy request 128. The 'committed' and 'allocated' values of forecast entry 116 do not change as a result, but the 'requested' and 'promised' values do. When 'promised' is equal to 'allocated', then there are no more promises available for promising customer requests.

This process is also depicted in the supply chain model example of FIG. 1. In FIG. 1, seller 50 generates forecast request 52 on site 22 for delivery to site 30 (which need not be a physical site). Request 52 results in site 22 generating operation 56 to perform the activity involved in delivering the requested items to site 30. If operation 56 is feasible to perform, then site 22 may choose to create promise 54 to seller 50 that the item can be delivered as requested by request 52.

Site 34 then places request 62 through seller 50 for the same product as request 52. If that customer request 62 is consistent with what seller 50 was forecasting, then seller 50 can reduce request 52, promise 54, and operation 56 by the amount of request 62, and then add promise 64 and operation 66 to fulfill request 62. That simple action did not require replanning through site 22. Effectively, the ability of site 22 to satisfy request 62 had been pre-computed in the form of promise 54. Thus, that promise 54 can be split in order to form promise 64.

A primary caveat is that the load and times of the operation 56 may not be valid when split into operation 66. For example, if operation 56 involved using a truck to transport the items, then splitting out operation 66 may result in an additional truck being used. If none was available, then operation 66 may have to wait. To compensate for this, each product defines criteria for splitting promises, which can include an amount of time with which to pad the due dates quoted.

Of the site models that make up a supply chain model (as in FIG. 1), some of the sites can be under the control of that supply chain model, while others can be modeling sites which are planned independently. A field of the site model called 'managed' indicates which sites are managed by this supply chain model and which are not. Two sites that are both managed do not need to make formal promises between each other—the request will generate an operation and all changes to the requests are immediately passed through the operation to the other site. Requests between a managed Site and an unmanaged site require formal promises. The promises must be made explicitly, and once accepted constitute a rigid agreement between two Sites. Changing that agreement requires both sites' consensus.

Adjustment as Time Passes

Forecasts are often, by their nature, wrong. Thus, as time passes and customer requests arrive faster or slower than expected, it is desirable to modify the forecasts as appropriate. Given a large number of products and numerous forecast periods, automated adjustment is highly desirable.

Thus, the product forecast policy can specify how the forecasted and committed quantities should be adjusted as time passes and actual Requests are received or not.

Figure 3:
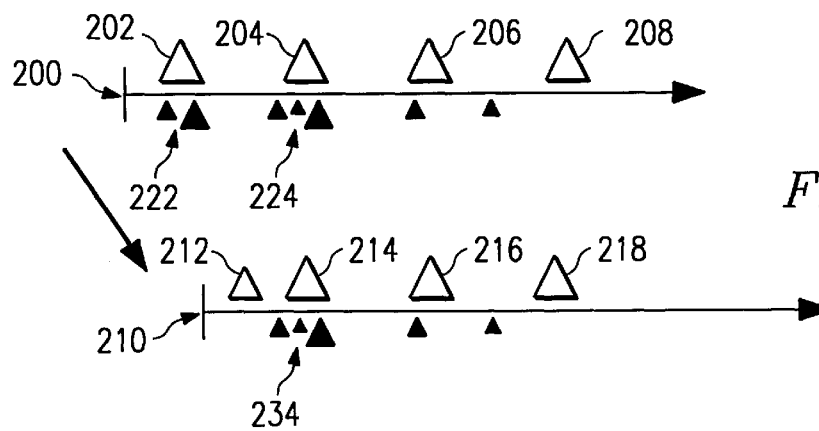
FIG. 3 illustrates one embodiment of a time horizon with forecast requests and actual requests showing the time horizon moving as time passes and the forecast requests adjusting in response.

FIG. 3 illustrates one embodiment of a time horizon with forecast requests and actual requests showing the time horizon moving as time passes and the forecast requests adjusting in response. The timeline 200 represents the initial state. Forecast requests 202, 204, 206, and 208 have been made in their respective forecast periods. Customer requests are indicated with triangles, as shown. The two customer requests 222 correspond to forecast request 202. The three customer requests 224 correspond to forecast request 204.

Time passes and no more requests are received. The timeline 210 represents that later state. Time has advanced beyond the forecast period of the forecast request 202. The customer requests 222 received during that period were less than that forecast request. One option is to assume the forecast was too high and simply expire the leftover forecast. Another option is to assume the forecast quantity is right, but that the timing is off—that the total quantity will be requested soon. In the latter case, the forecast request should be moved forward in time and reduced in quantity. This is shown as forecast request 212. There are many other options for how to expire, reduce, or increase forecast requests based on the arrival rate of customer requests that can be encoded in the product's forecast policy.

Allocation to Sellers

Figure 4:
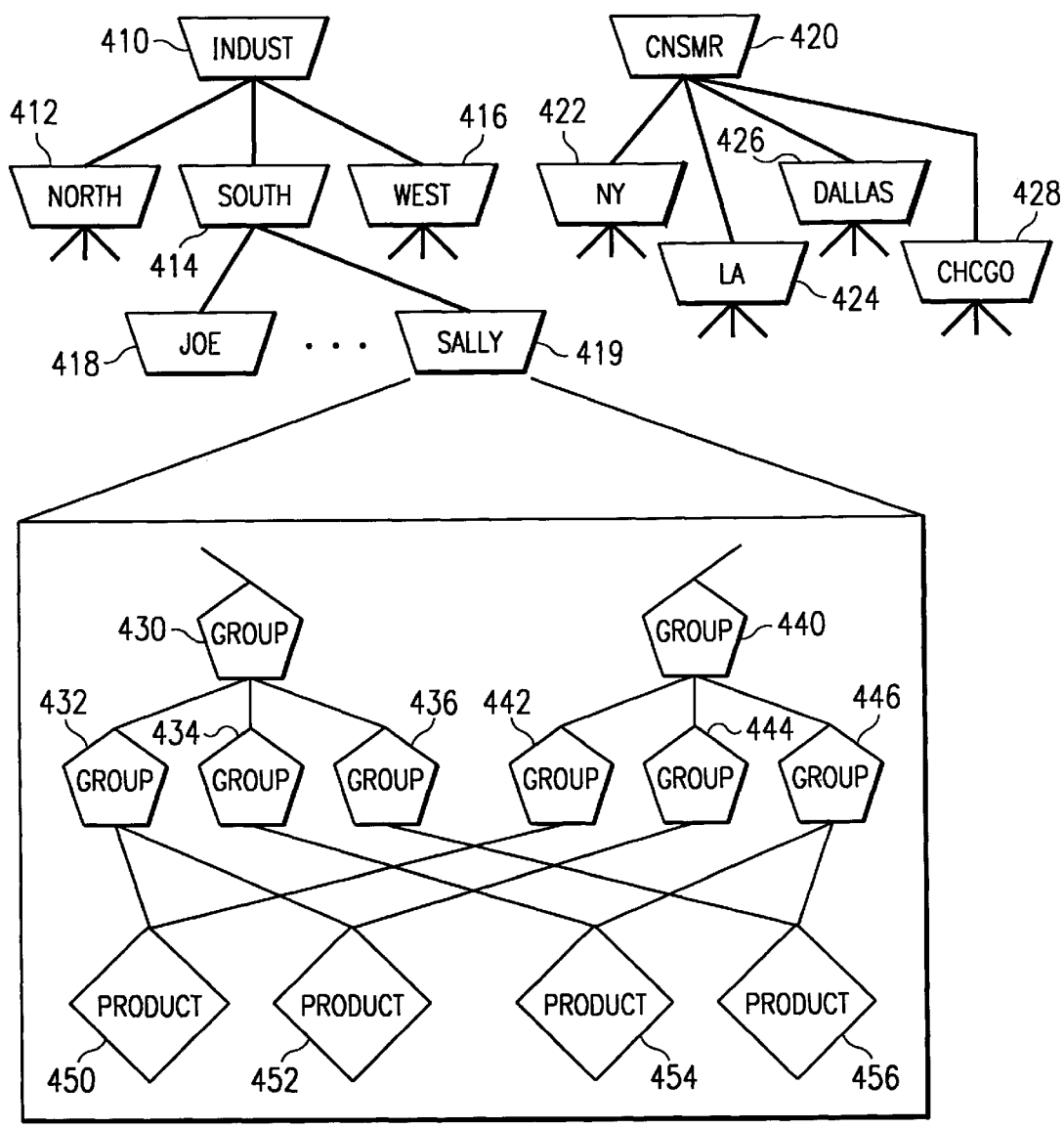
FIG. 4 illustrates one embodiment of a seller model hierarchy and a product group hierarchy within a seller.

FIG. 4 illustrates one embodiment of a seller model hierarchy and a product group hierarchy within a seller. FIG. 4 shows two Seller hierarchies. Seller 410 represents an Industrial Products marketing division, and seller 420 represents a Consumer Products marketing division. Within Industrial Products 410, there are three sales offices that each handle a region: the North is handled by seller 412; the South is handled by seller 414; the West is handled by seller 416. Each sales office is made up of numerous sales people, who are each represented by a seller (for example, Joe is seller 418 and Sally is seller 419).

In many organizations, the sellers may own their own allocations against which they can promise to their customers without consulting the company. However, sellers need not own any allocations. For example, Joe 418 and Sally 419, along with the other sellers in the South sales office 414, may each forecast what they intend to sell. Those forecasts are aggregated up to the sales office seller 414, where they are used as an input. The seller 414 can independently forecast for the whole sales office. That, in turn, is allocated up to the Industrial Products 410 division.

Clearly, forecast requests should not be generated for the forecasts at all three levels—that would result in triple the requests appropriate.

Instead, each seller can independently commit to selling some or all of the forecast. By committing, forecast requests are created in order to obtain promises which can be used to promise their customers. Those promises are owned by (or controlled by) that seller that committed to selling that amount.

However, it may be that some sellers do not commit at all. For example, none of the salespeople, including Joe 418 and Sally 419 commit to any of the forecast. Instead, the South sales office 414 commits as a whole. That results in allocations to the South Seller 414. Those allocations can be used by any of the sub-sellers, such as Joe 418 and Sally 419. However, such collective usage of the allocations requires coordination. They must reserve the amount they need before they can actually promise it, since the other sales people may be considering using the same allocations.

A seller is committed to anything its sub-sellers commit to. However, a seller can commit to additional, beyond what the sub-sellers commit to. For instance, each sales person may make a conservative commitment. The sales office will know that some of the sales people will surely sell over their commitment, but it is not clear which sales people. So the sales office can commit to sell additional, and those additional allocations will be available to the first sales people who exceed their personal allocation.

Product Groups

Forecasts tend to be more accurate in aggregate. A monthly forecast will generally be more accurate than a weekly forecast. A forecast for North America will generally be more accurate than a forecast for Texas. Similarly, a forecast for milk will generally be more accurate than for skim milk in pint containers.

Thus, it is important to be able to aggregate up forecasts, modify the aggregated forecasts, and propagate the changes back down to the individual products. The product group model supports this functionality.

Product groups form hierarchies. A product group can have at most one parent product group, and thus can be in at most one product group hierarchy.

Products, on the other hand, can appear in numerous product groups; however, only in one product group of any one hierarchy. A product group defines one consistent hierarchy for aggregation. However, sellers will need to aggregate the products in many different ways. For example, milk products can be aggregated by their container size (gallon, half gallon, quart, pint), by their fat content (whole, 2%, 1%, skim), by the customer grouping (grocery-store, restaurant, convenience-store), or by brand (ECONO-COW, PUREWHITE).

Product group s are depicted in FIG. 4. Products 450, 452, 454, and 456 are grouped into two product group hierarchies, rooted at product groups 430 and 440. Product group 430 is broken down into product groups 432, 434, and 436.

Advanced Available-to-promise (ATP)

Each seller has allocation (promises) available for the various products sold. When a customer request comes in to a seller, there may be numerous products that match the request. If the lowest cost product can fully satisfy the request (has sufficient quantity by the requested due date), then the request can simply be promised. Otherwise, a decision may be needed. For example, the customer may be able to choose to have it for a low price but a week later than requested, or by the date requested but 10% higher price. It may be that half the order can be completed on time at the lowest price, but the other half can either be delivered later or for a higher price, and so on. Thus, the ATP can be a list of different products (pricings) with different order lead times, minimum quantities, availability dates, and availability quantities.

Extensible Product Model

The product model type has a forecast policy extension selector that allows additional fields and semantics to be added to a product model. Extension selectors are described in more detail in U.S. application Ser. No. 08/491,152, filed Jun. 6, 1995, and entitled EXTENSIBLE MODEL NETWORK REPRESENTATION SYSTEM FOR PROCESS PLANNING (Attorney Docket No. 020431.0136), the disclosure of which has been incorporated herein by reference.

In this way, additional forecast information such as forecast error or forecasted variance in either quantity or time or both can be input and used. Additional fields for expected skew during the month can affect how the committed quantity is split out into forecast requests. The expected variance or order arrival rates can affect how forecast requests expire or adjust as time passes, based on the customer requests that have been received.

Although the present invention has been described in detail, it should be understood that various changes, substitutions and alternations can be made hereto without departing from the spirit and scope of the invention as defined by the appended claims.

What is claimed is:

1. A system for managing data associated with available to promise (ATP) products, comprising:
 a memory operable to store a hierarchy of at least two seller models that each represent a seller for one or more products, each product being represented using a product forecast model comprising:
  a forecast value representing forecasted sales of the product through the seller;
  a supply value representing planned supply of the product;
  a representation of customer orders for the product through the seller; and
  an allocation value representing unconsumed supply allocated to the seller; and
 a processor coupled to the memory and operable to:
  adjust the allocation values for sellers throughout the hierarchy according to one or more business criteria; and
  compute, for each product and each seller in the hierarchy, the amount of the product that is ATP at the seller according to the supply value for the seller, the allocation value for the seller, the amount of the product that is ATP at one or more parent sellers of the seller, the allocation values for one or more child sellers of the seller, and the representation of customer orders for the seller and its child sellers.

2. The system of claim 1, wherein the business criteria are selected from the group consisting of seller criteria, product criteria, forecast criteria, supply criteria, customer order criteria, and policy criteria.

3. The system of claim 1, wherein:
 each forecast model is extensible such that one or more allocation policy rules may be associated with the corresponding product;
 each allocation policy rule comprises a restriction on the allocation values for sellers throughout the hierarchy; and
 the allocation values are computed according to the allocation policy rules.

4. The system of claim 1, wherein each forecast model further comprises a plurality of supply plans, allocation values are computed according to the sum of the supply plans, and supply plans are associated with customer orders according to the business criteria.

5. The system of claim 1, further operable to adjust allocated values for one or more products for sellers throughout the hierarchy according to an arrival rate of customer orders for those products through those sellers.

6. The system of claim 1, further operable to:
communicate forecast models of each seller to a remote system;
receive from the remote system a promise computed at the remote system for a customer order requesting a quantity of a product through a particular seller, the promise being computed according to the allocation value for the seller;
receive from the remote system adjusted forecast models reflecting the promise; and
recompute the amount of the product that is ATP at sellers throughout the hierarchy.

7. The system of claim 6, wherein:
all forecast models for one or more sellers within the hierarchy are communicated to the remote system;
the system receives from the remote system a promise also computed according to the amount of product that is ATP at one or more parent sellers of the seller; and
adjust the amount of the product that is ATP at sellers throughout the hierarchy if the promise exceeds the allocation value for the seller.

8. The system of claim 1, further operable to adjust forecast values for one or more products for sellers throughout the hierarchy according to an arrival rate of customer orders for those products through those sellers.

9. The system of claim 8, wherein:
each forecast model is extensible such that one or more forecast policy rules may be associated with the corresponding product;
each forecast policy rule comprises at least one restriction on forecast values for sellers throughout the hierarchy; and
either the forecast values or the allocation values for sellers throughout the hierarchy are computed according to the forecast policy rules.

10. The system of claim 1, further operable to:
accept a customer order requesting a quantity of a product through a particular seller; and
compute a promise for the customer order according to the planned supply and one or more already existing customer orders for the product, the promise restricted according to the allocation value for the seller.

11. The system of claim 10, wherein:
the promise is also computed according to the amount of product that is ATP at one or more parent sellers of the seller; and
the amount of the product that is ATP at sellers is adjusted throughout the hierarchy if the promise exceeds the allocation value for the seller.

12. The system of claim 10, wherein:
a customer order promised less than its requested quantity may be queued for further consideration; and
the system is further operable to reconsider a queued customer order for opportunity to provide a more satisfactory promise in response to a supply plan being changed, an allocation value being adjusted, or a promise to another customer order being reduced.

13. The system of claim 1, wherein the forecast model further comprises a committed quantity representing an amount of the product the seller has committed to selling, the processor operable to adjust the allocation values for sellers throughout the hierarchy also according to the committed quantity.

14. The system of claim 13, further operable to adjust committed quantities for one or more products for sellers throughout the hierarchy according to an arrival rate of customer orders for those products through those sellers.

15. The system of claim 13, further operable to adjust allocated values for one or more products for sellers throughout the hierarchy according to an arrival rate of customer orders for those products through those sellers.

16. The system of claim 13, further operable to:
communicate forecast models of each seller to a remote system;
receive from the remote system a promise computed at the remote system for a customer order requesting a quantity of a product through a particular seller, the promise being computed according to the allocation value for the seller;
receive from the remote system adjusted forecast models reflecting the promise; and
recompute the amount of the product that is ATP at sellers throughout the hierarchy.

17. The system of claim 16, wherein:
all forecast models for one or more sellers within the hierarchy are communicated to the remote system;
the system receives from the remote system a promise also computed according to the amount of product that is ATP at one or more parent sellers of the seller; and
adjust the amount of the product that is ATP at sellers throughout the hierarchy if the promise exceeds the allocation value for the seller.

18. The system of claim 13, further operable to adjust forecast values for one or more products for sellers throughout the hierarchy according to an arrival rate of customer orders for those products through those sellers.

19. The system of claim 18, wherein:
each forecast model is extensible such that one or more forecast policy rules may be associated with the corresponding product;
each forecast policy rule comprises at least one restriction on forecast values for sellers throughout the hierarchy; and
either the forecast values or the allocation values for sellers throughout the hierarchy are computed according to the forecast policy rules.

20. A system for managing data associated with available to promise (ATP) products, comprising:
a memory operable to store at least one seller model representing a seller for a plurality of products, each product corresponding to a physical item with one or more restrictions on its sale, at least two products corresponding to the same physical item but with at least one different restriction, each product being represented using a product forecast model comprising:
a forecast value representing forecasted sales of the product through the seller;
a supply value representing planned supply of the product;
a representation of customer orders for the product through the seller; and
an allocation value representing unconsumed supply allocated to the seller; and a processor coupled to the memory and operable to:
  allow planned supply of a particular physical item to be distributed, according to one or more business criteria, among a plurality of products corresponding to the physical item,
  adjust the allocation values for sellers throughout the hierarchy according to the business criteria; and
  compute, for each product and each seller in the hierarchy, the amount of the product that is ATP at the seller according to the supply value for the seller, the allocation value for the seller, the amount of the product that is ATP at any one or more parent sellers of the seller, the allocation values for any one or more child sellers of the seller, and the representation of customer orders for the seller and its child sellers.

21. The system of claim 20, wherein the restrictions are selected from the group consisting of price restrictions, quantity restrictions, and lead time restrictions.

22. The system of claim 20, wherein the business criteria are selected from the group consisting of seller criteria, product criteria, forecast criteria, supply criteria, customer order criteria, and policy criteria.

23. The system of claim 20, wherein:
  each forecast model is extensible such that one or more allocation policy rules may be associated with the corresponding product;
  each allocation policy rule comprises a restriction on the allocation values for sellers throughout the hierarchy; and
  the allocation values are computed according to the allocation policy rules.

24. The system of claim 20, wherein allocation rules allocate supply plans for physical items to one or more corresponding products for sellers throughout the hierarchy.

25. The system of claim 20, wherein each forecast model further comprises a plurality of supply plans, allocation values are computed according to the sum of the supply plans, and supply plans are associated with customer orders according to the business criteria.

26. The system of claim 20, further operable to adjust allocated values for one or more products for sellers throughout the hierarchy according to an arrival rate of customer orders for those products through those sellers.

27. The system of claim 20, further operable to adjust forecast values for one or more products for sellers throughout the hierarchy according to an arrival rate of customer orders for those products through those sellers.

28. The system of claim 27, wherein:
  each forecast model is extensible such that one or more forecast policy rules may be associated with the corresponding product;
  each forecast policy rule comprises at least one restriction on forecast values for sellers throughout the hierarchy; and
  either the forecast values or the allocation values for sellers throughout the hierarchy are computed according to the forecast policy rules.

29. The system of claim 20, further operable to:
  communicate forecast models of each seller to a remote system;
  receive from the remote system a promise computed at the remote system for a customer order requesting a quantity of one or more physical items through a particular seller, the promise being computed according to at least the allocation values for corresponding products for the seller;
  receive from the remote system adjusted forecast models reflecting the promise; and
  recompute the amounts of the corresponding products that are ATP at sellers throughout the hierarchy.

30. The system of claim 29, wherein the promise comprises a plurality of options each with one or more of the restrictions specified for the products corresponding to the physical items.

31. The system of claim 29, wherein:
  all forecast models for one or more sellers within the hierarchy are communicated to the remote system;
  the system receives from the remote system a promise also computed according to the amounts of the corresponding products that are ATP at one or more parent sellers of the seller; and
  adjust the amounts of the corresponding products that are ATP at sellers throughout the hierarchy if the promise exceeds the allocation value for the seller.

32. The system of claim 30, further operable to:
  accept a customer order requesting quantities of one or more physical items through a particular seller; and
  compute a promise for the customer order according to the allocation values for at least corresponding products for the seller, wherein the promise comprises a plurality of options each with one or more of the restrictions specified for these products.

33. The system of claim 32, wherein:
  a customer order promised less than its requested quantity may be queued for further consideration; and
  the system is further operable to reconsider a queued customer order for opportunity to provide a more satisfactory promise in response to a supply plan being changed, an allocation value being adjusted, or a promise to another customer order being reduced.

34. The system of claim 32, further operable to:
  compute the promise also according to the amounts of the corresponding products that are ATP at one or more parent sellers of the seller; and
  adjust the amounts of the corresponding products that are ATP at sellers throughout the hierarchy if the promise exceeds the allocation values for the corresponding products for the seller.

35. The system of claim 20, wherein the forecast model further comprises a committed quantity representing amounts of the corresponding products the seller has committed to selling, the processor operable to adjust the allocation values for sellers throughout the hierarchy also according to the committed quantity.

36. The system of claim 35, further operable to adjust committed quantities for one or more products for sellers throughout the hierarchy according to an arrival rate of customer orders for those products through those sellers.

37. The system of claim 35, further operable to adjust allocated values for one or more products for sellers throughout the hierarchy according to an arrival rate of customer orders for those products through those sellers.

38. The system of claim 35, further operable to:
  communicate forecast models for each seller to a remote system;
  receive from the remote system a promise computed at the remote system for a customer order requesting a quantity of one or more physical items through a particular seller, the promise being computed according to at least the allocation values for corresponding products for the seller;

receive from the remote system adjusted forecast models reflecting the promise; and recompute the amounts of the corresponding products that are ATP at sellers throughout the hierarchy.

39. The system of claim 38, wherein:

all forecast models for one or more sellers within the hierarchy are communicated to the remote system;

the system receives from the remote system a promise also computed according to the amounts of the corresponding products that are ATP at one or more parent sellers of the seller; and adjust the amounts of the corresponding products that are ATP at sellers throughout the hierarchy if the promise exceeds the allocation value for the seller.

40. The system of claim 35, further operable to adjust forecast values for one or more products for sellers throughout the hierarchy according to an arrival rate of customer orders for those products through those sellers.

41. The system of claim 40, wherein:

each forecast model is extensible such that one or more forecast policy rules may be associated with the corresponding product;

each forecast policy rule comprises at least one restriction on forecast values for sellers throughout the hierarchy; and either the forecast values or the allocation values for sellers throughout the hierarchy are computed according to the forecast policy rules.

42. A method for managing data associated with available to promise (ATP) products, comprising:

storing a hierarchy of at least two seller models that each represent a seller for one or more products, each product being represented using a product forecast model comprising:

a forecast value representing forecasted sales of the product through the seller;

a supply value representing planned supply of the product;

a representation of customer orders for the product through the seller; and an allocation value representing unconsumed supply allocated to the seller; and adjusting the allocation values for sellers throughout the hierarchy according to one or more business criteria; and computing, for each product and each seller in the hierarchy, the amount of the product that is ATP at the seller according to the supply value for the seller, the allocation value for the seller, the amount of the product that is ATP at any one or more parent sellers of the seller, the allocation values for any one or more child sellers of the seller, and the representation of customer orders for the seller and its child sellers.

43. The method of claim 42, wherein the business criteria are selected from the group consisting of seller criteria, product criteria, forecast criteria, supply criteria, customer order criteria, and policy criteria.

44. The method of claim 42, wherein:

each forecast model is extensible such that one or more allocation policy rules may be associated with the corresponding product;

each allocation policy rule comprises a restriction on the allocation values for sellers throughout the hierarchy; and the allocation values are computed according to the allocation policy rules.

45. The method of claim 42, wherein each forecast model further comprises a plurality of supply plans, allocation values are computed according to the sum of the supply plans, and supply plans are associated with customer orders according to the business criteria.

46. The method of claim 42, further comprising adjusting allocated values for one or more products for sellers throughout the hierarchy according to an arrival rate of customer orders for those products through those sellers.

47. The method of claim 42, further comprising:

communicating forecast models of each seller to a remote system;

receiving a promise computed at the remote system for a customer order requesting a quantity of a product through a particular seller, the promise having been computed according to the allocation value for the seller;

receiving from the remote system adjusted forecast models reflecting the promise; and recomputing the amount of the product that is ATP at sellers throughout the hierarchy.

48. The method of claim 47:

wherein all forecast models for one or more sellers in the hierarchy are communicated to the remote system;

wherein the promise has also been computed according to the amount of product that is ATP at one or more parent sellers of the seller; and further comprising adjusting the amount of the product that is ATP at sellers throughout the hierarchy if the promise exceeds the allocation value for the seller.

49. The method of claim 42, further comprising adjusting forecast values for one or more products for sellers throughout the hierarchy according to an arrival rate of customer orders for those products through those sellers.

50. The method of claim 49, wherein:

each forecast model is extensible such that one or more forecast policy rules may be associated with the corresponding product;

each forecast policy rule comprises at least one restriction on forecast values for sellers throughout the hierarchy; and either the forecast values or the allocation values for sellers throughout the hierarchy are computed according to the forecast policy rules.

51. The method of claim 42, further comprising:

accepting a customer order requesting a quantity of a product through a particular seller; and computing a promise for the customer order according to the planned supply and one or more already existing customer orders for the product, the promise restricted according to the allocation value for the seller.

52. The method of claim 51, wherein:

the promise is also computed according to the amount of product that is ATP at one or more parent sellers of the seller; and the amount of the product that is ATP at sellers is adjusted throughout the hierarchy if the promise exceeds the allocation value for the seller.

53. The method of claim 51, further comprising:

queuing for further consideration a customer order promised less than its requested quantity; and reconsidering a queued customer order for opportunity to provide a more satisfactory promise in response to a supply plan being changed, an allocation value being adjusted, or a promise to another customer order being reduced.

54. The method of claim 42:

wherein the forecast model further comprises a committed quantity that represents an amount of the product the seller has committed to selling; and further comprising adjusting allocation values for sellers throughout the hierarchy also according to the committed quantity.

55. The method of claim 54, further comprising adjusting the committed quantities for one or more products for sellers throughout the hierarchy according to an arrival rate of customer orders for those products through those sellers.

56. The method of claim 54, further comprising adjusting allocated values for one or more products for sellers throughout the hierarchy according to an arrival rate of customer orders for those products through those sellers.

57. The method of claim 54, further operable to:

communicating forecast models of each seller to a remote system;

receiving a promise computed at the remote system for a customer order requesting a quantity of a product through a particular seller, the promise having been computed according to the allocation value for the seller;

receiving from the remote system adjusted forecast models reflecting the promise; and recomputing the amount of the product that is ATP at sellers throughout the hierarchy.

58. The method of claim 57:

wherein all forecast models for one or more sellers in the hierarchy are communicated to the remote system;

wherein the promise has also been computed according to the amount of product that is ATP at one or more parent sellers of the seller; and further comprising adjusting the amount of the product that is ATP at sellers throughout the hierarchy if the promise exceeds the allocation value for the seller.

59. The method of claim 54, further comprising adjusting forecast values for one or more products for sellers throughout the hierarchy according to an arrival rate of customer orders for those products through those sellers.

60. The method of claim 59, wherein:

each forecast model is extensible such that one or more forecast policy rules may be associated with the corresponding product;

each forecast policy rule comprises at least one restriction on forecast values for sellers throughout the hierarchy; and either the forecast values or the allocation values for sellers throughout the hierarchy are computed according to the forecast policy rules.

61. A method for managing data associated with available to promise (ATP) products, comprising:

storing at least one seller model representing a seller for a plurality of products, each product corresponding to a physical item with one or more restrictions on its sale, at least two products corresponding to the same physical item but with at least one different restriction, each product being represented using a product forecast model comprising:

a forecast value representing forecasted sales of the product through the seller;

a supply value representing planned supply of the product;

a representation of customer orders for the product through the seller; and an allocation value representing unconsumed supply allocated to the seller; and allowing planned supply of a particular physical item to be distributed, according to one or more business criteria, among a plurality of products corresponding to the physical item, adjusting the allocation values for sellers throughout the hierarchy according to the business criteria; and computing, for each product and each seller in the hierarchy, the amount of the product that is ATP at the seller according to the supply value for the seller, the allocation value for the seller, the amount of the product that is ATP at any one or more parent sellers of the seller, the allocation values for any one or more child sellers of the seller, and the representation of customer orders for the seller and its child sellers.

62. The method of claim 61, wherein the restrictions are selected from the group consisting of price restrictions, quantity restrictions, and lead time restrictions.

63. The method of claim 61, wherein the business criteria are selected from the group consisting of seller criteria, product criteria, forecast criteria, supply criteria, customer order criteria, and policy criteria.

64. The method of claim 61, wherein:

each forecast model is extensible such that one or more allocation policy rules may be associated with the corresponding product;

each allocation policy rule comprises a restriction on the allocation values for sellers throughout the hierarchy; and the allocation values are computed according to the allocation policy rules.

65. The method of claim 61, wherein allocation rules allocate supply plans for physical items to one or more corresponding products for sellers throughout the hierarchy.

66. The method of claim 61, wherein each forecast model further comprises a plurality of supply plans, allocation values are computed according to the sum of the supply plans, and supply plans are associated with customer orders according to the business criteria.

67. The method of claim 61, further comprising adjusting allocated values for one or more products for sellers throughout the hierarchy according to an arrival rate of customer orders for those products through those sellers.

68. The method of claim 61, further comprising adjusting forecast values for one or more products for sellers throughout the hierarchy according to an arrival rate of customer orders for those products through those sellers.

69. The method of claim 68, wherein:

each forecast model is extensible such that one or more forecast policy rules may be associated with the corresponding product;

each forecast policy rule comprises at least one restriction on forecast values for sellers throughout the hierarchy; and either the forecast values or the allocation values for sellers throughout the hierarchy are computed according to the forecast policy rules.

70. The method of claim 61, further comprising:

communicating forecast models of each seller to a remote system;

receiving a promise computed at the remote system for a customer order requesting a quantity of one or more physical items through a particular seller, the promise having been computed according to at least the allocation values for corresponding products for the seller;

receiving from the remote system adjusted forecast models reflecting the promise; and recomputing the amounts of the corresponding products that are ATP at sellers throughout the hierarchy.

71. The method of claim 70, wherein the promise comprises a plurality of options each with one or more of the restrictions specified for the products corresponding to the physical items.

72. The method of claim 70:

wherein all forecast models for one or more sellers in the hierarchy are communicated to the remote system;

wherein the system receives from the remote system a promise also computed according to the amounts of the corresponding products that are ATP at one or more parent sellers of the seller; and further comprising adjusting the amounts of the corresponding products that are ATP at sellers throughout the hierarchy if the promise exceeds the allocation value for the seller.

73. The method of claim 61, further comprising:

accepting a customer order requesting quantities of one or more physical items through a particular seller; and computing a promise for the customer order according to the allocation values for at least corresponding products for the seller, wherein the promise comprises a plurality of options each with one or more of the restrictions specified for these products.

74. The method of claim 73, further comprising:

queuing for further consideration a customer order promised less than its requested quantity; and reconsidering a queued customer order for opportunity to provide a more satisfactory promise in response to a supply plan being changed, an allocation value being adjusted, or a promise to another customer order being reduced.

75. The method of claim 73, further operable to:

computing the promise also according to the amounts of the corresponding products that are ATP at one or more parent sellers of the seller; and adjusting the amounts of the corresponding products that are ATP at sellers throughout the hierarchy if the promise exceeds the allocation values for the corresponding products for the seller.

76. The method of claim 61, wherein the forecast model further comprises a committed quantity representing amounts of the corresponding products the seller has committed to selling, the processor operable to adjust the allocation values for sellers throughout the hierarchy also according to the committed quantity.

77. The method of claim 76, further comprising adjusting the committed quantities for one or more products for sellers throughout the hierarchy according to an arrival rate of customer orders for those products through those sellers.

78. The method of claim 76, further comprising adjusting allocated values for one or more products for sellers throughout the hierarchy according to an arrival rate of customer orders for those products through those sellers.

79. The method of claim 76, further comprising:

communicating forecast models for each seller to a remote system;

receiving a promise computed at the remote system for a customer order requesting a quantity of one or more physical items through a particular seller, the promise having been computed according to at least the allocation values for corresponding products for the seller;

receiving from the remote system adjusted forecast models reflecting the promise; and recomputing the amounts of the corresponding products that are ATP at sellers throughout the hierarchy.

80. The method of claim 79:

wherein all forecast models for one or more sellers in the hierarchy are communicated to the remote system;

wherein the system receives from the remote system a promise also computed according to the amounts of the corresponding products that are ATP at one or more parent sellers of the seller; and further comprising adjusting the amounts of the corresponding products that are ATP at sellers throughout the hierarchy if the promise exceeds the allocation value for the seller.

81. The method of claim 76, further comprising adjusting forecast values for one or more products for sellers throughout the hierarchy according to an arrival rate of customer orders for those products through those sellers.

82. The method of claim 81, wherein:

each forecast model is extensible such that one or more forecast policy rules may be associated with the corresponding product;

each forecast policy rule comprises at least one restriction on forecast values for sellers throughout the hierarchy; and either the forecast values or the allocation values for sellers throughout the hierarchy are computed according to the forecast policy rules.

* * * * *

UNITED STATES PATENT AND TRADEMARK OFFICE
CERTIFICATE OF CORRECTION

PATENT NO. : 6,188,989 B1  Page 1 of 1
DATED : February 13, 2001
INVENTOR(S) : Brian M. Kennedy It is certified that error appears in the above-identified patent and that said Letters Patent is hereby corrected as shown below:

Title page, Item [54] and Column 1, Line 2,
After "TO", delete "PROMISED", and insert -- PROMISE --.

Signed and Sealed this

Eighteenth Day of December, 2001

Attest:

JAMES E. ROGAN
Attesting Officer   Director of the United States Patent and Trademark Office